United States Patent
Lipka et al.

(10) Patent No.: US 8,259,875 B2
(45) Date of Patent: Sep. 4, 2012

(54) TECHNIQUE FOR DETERMINING A FREQUENCY OFFSET

(75) Inventors: Dietmar Lipka, Berg (DE); Stefan Mueller-Weinfurtner, Nürnberg (DE); Udo Wachsmann, Schwabach (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 151 days.

(21) Appl. No.: 12/837,652

(22) Filed: Jul. 16, 2010

(65) Prior Publication Data

US 2011/0026649 A1    Feb. 3, 2011

Related U.S. Application Data

(60) Provisional application No. 61/233,586, filed on Aug. 13, 2009.

(30) Foreign Application Priority Data

Jul. 28, 2009    (EP) .................................... 09009716

(51) Int. Cl.
*H04L 27/06* (2006.01)
(52) U.S. Cl. ........ 375/343; 375/229; 375/230; 375/260; 375/261; 375/262; 375/267; 375/295; 375/317; 375/349
(58) Field of Classification Search ............. 375/343, 375/229, 230, 260, 261, 262, 267, 295, 296, 375/317, 349
See application file for complete search history.

(56) References Cited

U.S. PATENT DOCUMENTS

| 7,835,433 | B2 * | 11/2010 | Sanada et al. | 375/230 |
| 7,916,714 | B2 * | 3/2011 | Han et al. | 370/350 |
| 2007/0298780 | A1 * | 12/2007 | Lindoff et al. | 455/423 |
| 2008/0095249 | A1 | 4/2008 | Yoon et al. | |
| 2009/0202021 | A1 * | 8/2009 | Cheng et al. | 375/317 |

FOREIGN PATENT DOCUMENTS

CN    1 822 576 A    8/2006

OTHER PUBLICATIONS

Kyung-Taek Lee et al. Pilot-Aided Iterative Frequency Offset Estimation for Digital Video Broadcasting (DVB) Systems. IEEE Transactions on Consumer Electronics, IEEE Service Center, New York, NY, US. vol. 53 No. 1; Feb. 1, 2007.

* cited by examiner

*Primary Examiner* — Dhaval Patel

(57) ABSTRACT

A technique for determining a frequency offset between components of a communication network based on a Constant Amplitude Zero Auto-Correlation (CAZAC) sequence is described. A method implementation of this technique comprises a provision of a set of correlation signals at different frequencies, with each correlation signal being indicative of a specific frequency offset hypothesis and comprising the CAZAC sequence. Once a synchronization signal comprising the CAZAC sequence is received, this synchronization signal is correlated with each of the correlation signals to obtain a correlation result for each frequency offset hypothesis. In a next step, at least one of the frequency offset hypotheses is selected based on a comparison of the correlation results. The frequency offset may then be determined based on the at least one selected frequency offset hypothesis.

15 Claims, 6 Drawing Sheets

TECHNIQUE FOR DETERMINING A FREQUENCY OFFSET

This application claims the benefit of EP patent application number 09009716.3 filed on Jul. 28, 2009, and U.S. Provisional patent application No. 61/233,586, filed on Aug. 13, 2009 the disclosure of which is fully incorporated herein by reference.

TECHNICAL FIELD

The present disclosure generally relates to the determination of a frequency offset between components of a communications network. In particular, a technique for determining a frequency offset based on a synchronization signal having a Constant Amplitude Zero Auto-Correlation (CAZAC) waveform is disclosed.

BACKGROUND

In multi-transmitter communications networks, channel access techniques allow multiple transmitters connected to the same physical channel to share its transmission capacity. Various such channel access techniques are known in the art. For example, in second generation communications systems according to the Global System for Mobile communications (GSM) standard, Time Division Multiple Access (TDMA) techniques are utilized to divide a specific frequency channel into individual time slots assigned to individual transmitters. In third generation communications systems, Code Division Multiple Access (CDMA) techniques divide channel access in the signal space by employing a combination of spread spectrum operations and a special coding scheme in which each transmitter is assigned an individual code. The next advance in wireless communications systems considers Orthogonal Frequency Division Multiple Access (OFDMA) techniques to achieve still higher bit rates.

One major advantage of OFDMA over other channel access techniques is its robustness in the presence of multi-path signal propagation. On the other hand, the waveform of OFDMA signals exhibits envelope fluctuations resulting in a comparatively high Peak-to-Average Power Ratio (PAPR). The disadvantage of a high PAPR inherent to OFDMA is to a certain extent overcome by Single Carrier Frequency Division Multiple Access (SC-FDMA), which can be regarded as a modification of the OFDMA technique. The Third Generation Partnership Project (3GPP) is considering using both OFDMA and SC-FDMA in next generation communications systems currently standardized in the Long Term Evolution (LTE) project.

According to section 5 of the 3GPP Technical Specification TS 36.211 "Physical Channels and Modulation", V8.7.0 of May 2009, SC-FDMA will be implemented in LTE user equipment for the uplink direction towards the LTE access network. OFDMA, on the other hand, will be used in the downlink direction from the LTE access network towards the user equipment (see section 6 of TS 36.211).

In TS 36.211, the smallest time-frequency unit for downlink transmission is denoted a resource element. The mapping between resource elements on the one hand and physical channels on the other is described by resource blocks. A resource block is defined as a pre-determined number of consecutive SC-FDMA or OFDM symbols in the time domain and a pre-determined number of consecutive subcarriers in the frequency domain. An LTE downlink subframe may be represented as a resource grid comprising several resource blocks destined for different users.

Certain resource elements at pre-defined positions in the downlink resource grid are reserved for synchronization and reference signalling. The Primary Synchronization Signal (P-SS), for example, occupies 72 resource elements in the centre of the downlink signal spectrum. It occurs every 5 ms and shares its spectrum with resource elements carrying data. The P-SS is used by LTE user equipment for initial frequency offset estimation.

User equipment derives all clocks and frequencies from an internal reference oscillator. During regular operation, the oscillator is controlled to match the centre frequency of the receiver to the centre frequency of the downlink signal. Upon its activation, however, the reference oscillator is uncontrolled so that the receiver will typically have a frequency offset relative to the downlink signal. As part of the user equipment synchronization procedure it is therefore necessary to derive, based on the P-SS, an estimation of the frequency offset for an initial adjustment of the reference oscillator.

According to section 6.11.1.1 of TS 36.211, the P-SS is generated based on a Zadoff-Chu sequence. Each Zadoff-Chu sequence comprises complex-valued symbols (also called samples) which, when modulated onto a radio carrier, give rise to an electro-magnetic signal of constant amplitude. Signals comprising cyclically shifted versions of a specific Zadoff-Chu sequence do not cross-correlate (i.e., remain orthogonal to each other) when recovered at a receiver, provided that the cyclical shift is greater than a specific threshold defined by propagation delay and multi-path delay spread. An electromagnetic signal carrying a Zadoff-Chu sequence thus has a CAZAC waveform.

While exhibiting excellent correlation properties, CAZAC sequences and in particular Zadoff-Chu sequences are insensitive to frequency offsets. This means that, if the received P-SS is correlated by LTE user equipment with the Zadoff-Chu sequence originally used to generate the P-SS, a correlation peak can occur even though there might exist a frequency offset between the LTE access network and the user equipment. Due to the frequency offset the correlation peak will be shifted along the time axis with respect to the timing of the LTE access network, and the actual time shift depends on the specific frequency offset. However, since the timing of the LTE access network is not known either to the user equipment, it is not possible to conclude on the frequency offset. This time-frequency ambiguity is a problem when having to determine the frequency offset.

SUMMARY

Accordingly, it is an object of the present invention to provide a technique to determine a frequency offset between components of a mobile communications network based on a synchronization signal carrying a CAZAC sequence.

According to a first aspect, a method of determining a frequency offset between components of a communications network based on a Constant Amplitude Zero Auto-Correlation (CAZAC) sequence is provided. The method comprises providing a set of correlation signals at different frequencies, with each correlation signal being indicative of a specific frequency offset hypothesis and comprising the CAZAC sequence, receiving a synchronization signal comprising the CAZAC sequence, correlating the synchronization signal with each of the correlation signals to obtain a correlation result for each frequency offset hypothesis, selecting at least one of the frequency offset hypotheses based on a comparison of the correlation results, and determining the frequency offset based on the at least one selected frequency offset hypothesis.

Based on the testing of multiple frequency offset hypotheses, the time-frequency ambiguity associated with the correlation of signals derived from a specific CAZAC sequence may be resolved. As a result of this testing, any frequency offset can efficiently be determined.

In one implementation, the communications network supports Orthogonal Frequency Division Multiplexing (OFDM). As understood herein, OFDM also comprises SC-FDMA (which can be regarded as a Discrete Fourier Transform-spread OFDM). In an OFDM implementation, the frequency spacing of the correlation signals may be selected dependent on an OFDM subcarrier spacing. The frequency spacing of two adjacent correlation signals may, for example, be approximately half or less of the OFDM subcarrier spacing. In a communications network configured according to the LTE standard (which defines a subcarrier spacing of 15 kHz), the frequency spacing of adjacent correlation signals may thus approximately amount to 7.5 kHz or less. In the LTE context, the synchronization signal may be the LTE P-SS.

The frequency spacing between two correlation signals adjacent in the frequency spectrum may be the same for all correlation signals. Alternatively, the correlation signals may be located in a non-equidistant manner in the frequency spectrum.

According to a first variant, two or more of the frequency offset hypotheses are selected. The frequency offset may then be determined based on an interpolation of the selected frequency offset hypotheses. According to a second variant, a single frequency offset hypothesis is selected. In this case, the frequency offset may be determined to correspond to the (single) selected frequency offset hypothesis. The correlation result for each correlation may be a magnitude of a correlator output (e.g., of a correlation peak). In such an implementation, at least the frequency offset hypothesis corresponding to the largest magnitude may be selected.

In certain communications networks a set of different CAZAC sequences is defined that may possibly be included in the synchronization signal. The LTE standard, for example, defines three different root indices corresponding to three different Zadoff-Chu sequences. In the case multiple CAZAC sequences are defined, for each possible CAZAC sequence a dedicated set of correlation signals may be provided and correlated with the synchronization signal. Accordingly, the correlation results may additionally be evaluated to determine the specific CAZAC sequence included in the synchronization signal.

The received synchronization signal may be subjected to one or more supplemental signal processing operations. For example, the synchronization signal may be filtered to extract a target frequency range prior to the correlation step. This filtering operation can advantageously be applied if the frequency location of the signal content to be subjected to the correlation step is known a priori.

The synchronization signal may additionally, or in the alternative, be subjected to a sub-sampling operation. As a result of the sub-sampling operation, the computational complexity of the correlation step may be reduced. In the case the received synchronization signal is sub-sampled, each correlation signal may be provided at the (sub-sampled) sampling rate of the received synchronization signal.

The determination of the frequency offset may further comprise averaging multiple correlation results obtained for each correlation signal prior to the selection step. In other words, when the synchronization signal is transmitted repeatedly at different points in time, the correlation step may be repeated for subsequently received synchronization signals, and the multiple correlation results obtained for each individual correlation signal may be averaged. Alternatively, or in addition, the correlation results may be filtered prior to the selection step (using, for example, a sliding window technique). The filtering operation can advantageously be used to collect the energy of multiple paths in a specific hypothesis to suppress noise contribution by the averaging inherent to the filtering operation.

The CAZAC sequence may have the property that a frequency offset between the synchronization signal and a specific correlation signal does not suppress a magnitude of a resulting correlation output (e.g., in the sense that a non-zero correlation output is obtained in spite of a non-zero frequency offset). As an additional or alternative property of the CAZAC sequence, a frequency offset between the synchronization signal and a specific correlation signal may cause a time shift of the resulting correlation output (e.g., of a correlation peak) relative to a correlation output for a zero frequency offset. As an example, the CAZAC sequence may be a Zadoff-Chu sequence or any Zadoff-Chu-like sequence.

The techniques presented herein may be realised in the form of software, in the form of hardware, or using a combined software/hardware approach. As regards a software aspect, a computer program product comprising program code portions for performing the steps presented herein when the computer program product is run on one or more computing devices may be provided. The computer program product may be stored on a computer-readable recording medium such as a memory chip, a CD-ROM, a hard disk, and so on. Moreover, the computer program product may be provided for download onto such a recording medium.

According to a further aspect, a device for determining a frequency offset between components of a communications network based on a CAZAC sequence is provided. The device comprises a unit adapted to provide a set of correlation signals at different frequencies, with each correlation signal being indicative of a specific frequency offset hypothesis and comprising the CAZAC sequence. The device further comprises a receiver adapted to receive a synchronization signal comprising the CAZAC sequence, a correlator adapted to correlate the synchronization signal with each of the correlation signals to obtain a correlation result for each frequency offset hypothesis, a selector adapted to selected at least one of the frequency offset hypotheses based on a comparison of the correlation results, and a determination unit adapted to determine the frequency offset based on the at least one selected frequency offset hypothesis.

The device may further comprise an interpolator adapted to interpolate a plurality of selected frequency offset hypotheses. In such an implementation, the determination unit may further be adapted to determine the frequency offset based on a result of the interpolation.

Also provided is a user terminal comprising such a device. The terminal may be configured to support OFDM and may thus be compliant with the LTE or LTE-Advanced standard. In a terminal supporting OFDM, a frequency spacing of the correlation signals may be selected dependent on an OFDM subcarrier spacing. Possible implementations of the terminal include mobile telephones, network or data cards, portable computers with network access capabilities and so on.

BRIEF DESCRIPTION OF THE DRAWINGS

Further aspects and advantages of the technique presented herein will become apparent from the following description of preferred embodiments and the drawings, wherein.

DETAILED DESCRIPTION

In the following description of preferred embodiments, for purposes of explanation and not limitation, specific details are set forth (such as particular signal processing components and sequences of steps) in order to provide a thorough understanding of the present invention. It will be apparent to one skilled in the art that the techniques described herein may be practiced in other embodiments that depart from these specific details. For example, while the following embodiments will primarily be described in context with an OFDM-compliant receiver stage, the present invention can also be implemented in other receiver stages operating on the basis of CAZAC sequences. While the embodiments relate to an exemplary LTE implementation, it will be readily apparent that the techniques described herein may also be implemented in other mobile and stationary communications networks (such as LTE-Advanced networks).

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in context with methods and devices, the invention may also be embodied in a computer program product as well as in a system comprising a computer processor and a memory coupled to the processor, wherein the memory is encoded with one or more programs that may perform the services, functions and steps disclosed herein.

In the following embodiments, the process of frequency offset determination will exemplarily be described with reference to an initial frequency offset estimation based on the P-SS in an LTE-compliant communications network. The signal content of the P-SS, its generation in the access network and its mapping to resource elements is defined in section 6.11.1 of TS 36.211.

In the access network, the symbol sequence S(k,m) comprised by the P-SS is generated from a frequency-domain Zadoff-Chu root sequence according to $$S(k, m) = \begin{cases} e^{-j\pi u_m (k+31)(k+32)/63} & k = [-31, \ldots, -1, 1, \ldots, 31] \\ 0 & \text{otherwise} \end{cases},$$

where the Zadoff-Chu root sequence index $u_m$ assumes one of the values 25, 29 or 34 (see TS 36.211, section 6.11.1.1) corresponding to one of the physical-layer identities within the physical-layer cell-identity group m=[0,1,2], and k is a frequency domain index.

The resulting Zadoff-Chu sequence is then converted in the access network to the time domain, $$s(n,m) = \text{IDFT}(S(k,m)),$$

and sent out on the downlink after a cyclic prefix has been added. n is a time domain index and IDFT denotes the inverse discrete Fourier transform.

Figure 1:
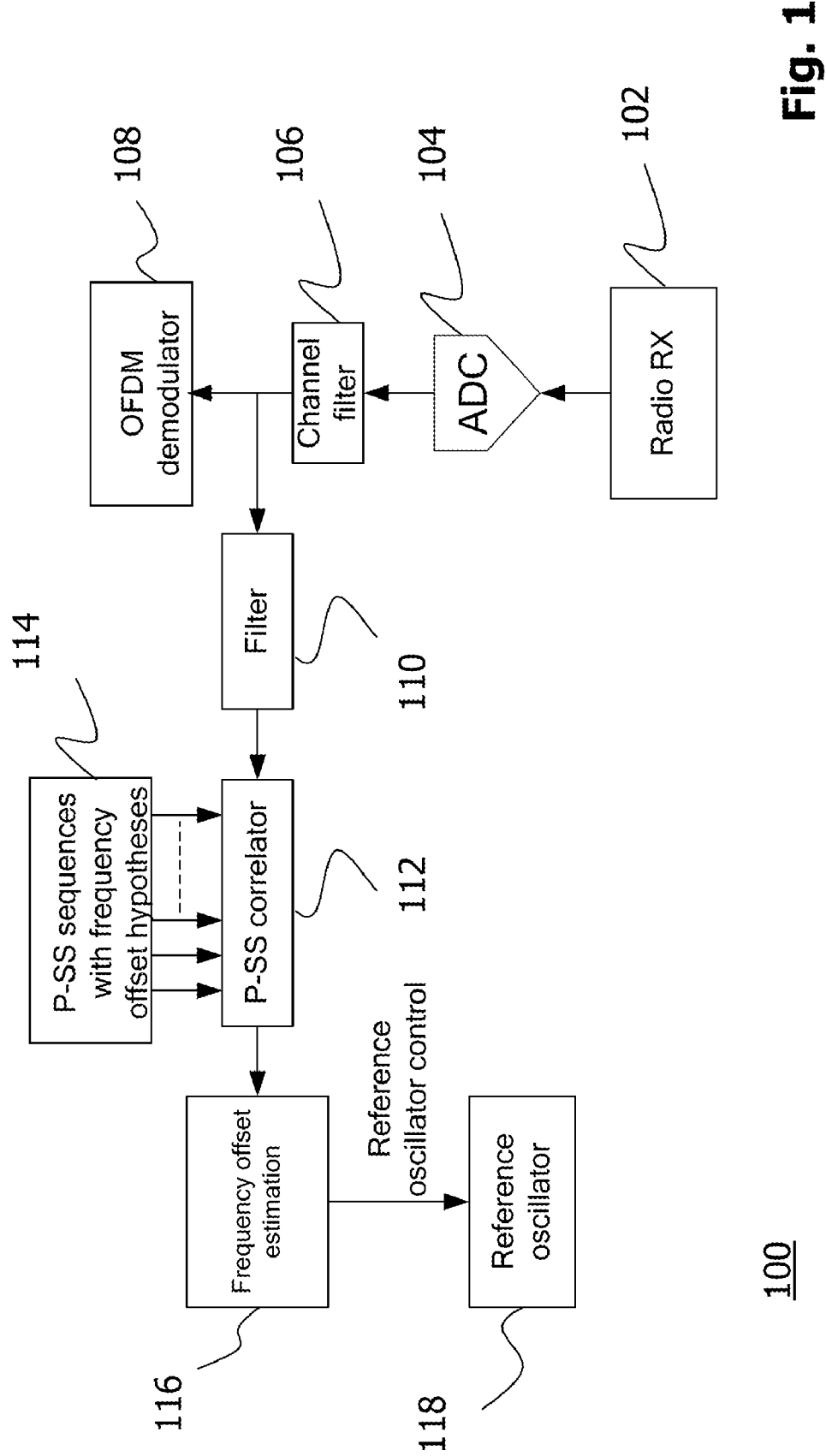
FIG. 1 schematically illustrates a receiver stage including an embodiment of a device for frequency offset determination.

To detect the P-SS, the downlink signal will be correlated with s(n,m) by a receiving user terminal (i.e., the LTE user equipment). FIG. 1 shows an embodiment of a receiver stage 100 that may be installed in the user terminal. The user terminal may take the form of a mobile telephone or may be incorporated, for example as a network card or data stick, in a stationary or portable computer.

In a conventional manner, the receiver stage 100 comprises a Radio Frequency (RF) receiver 102 configured to receive a downlink signal (including the embedded P-SS) from the access network and to down-convert the downlink signal to baseband frequency. The receiver stage 100 further comprises an analog/digital converter 104 coupled to an output of the receiver 102 and a channel filter 106 coupled to an output of the analog/digital converter 104. An OFDM demodulator 108 is coupled to an output of the channel filter 106 to perform the conventional OFDM demodulation operation. The demodulation operation and the subsequent processing steps will not be discussed further here.

In addition to the OFDM processing branch, a further processing branch capable of frequency offset determination taps the output of the channel filter 106. This further signal processing branch comprises an optional filter 110 and a P-SS correlator 112 having a first input coupled to an output of the filter 110. The P-SS correlator 112 additionally has a second input coupled to a unit 114 that is adapted to provide a set of correlation signals at different frequencies.

Figure 2:
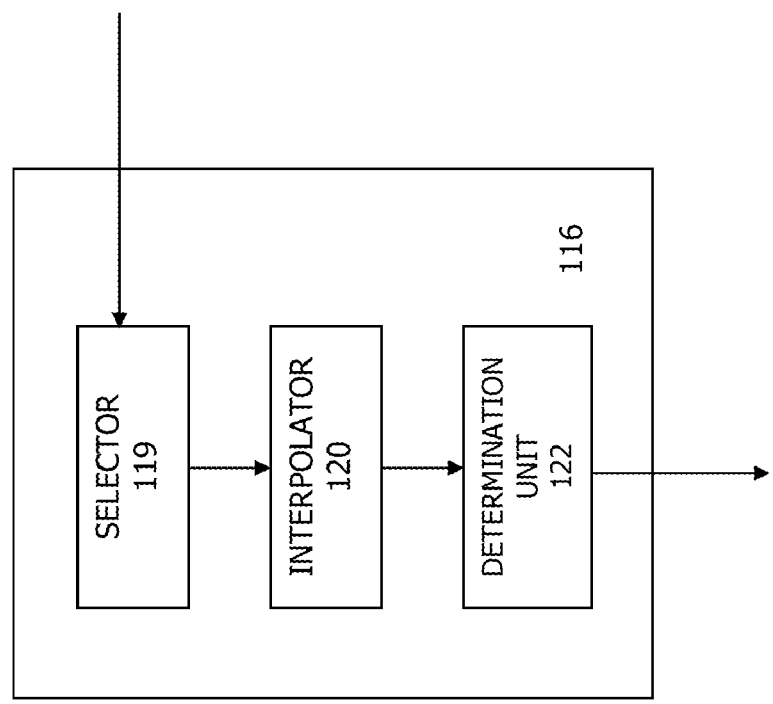
FIG. 2 schematically illustrates the components of a frequency offset estimator comprised by the device of FIG. 1.

A frequency offset estimator 116 is coupled to an output of the P-SS correlator 112 and configured to generate a reference oscillator control signal for a reference oscillator 118. The frequency offset estimator 116 comprises a plurality of internal components as illustrated in FIG. 2. These internal components comprise a selector 119, an optional interpolator 120 as well as a frequency offset determination unit 122.

The operation of the receiver stage 100 as illustrated in FIGS. 1 and 2 will now be described in more detail with reference to the schematic flow diagram 300 of FIG. 3.

It is supposed that the reference oscillator 118 in the terminal will initially not yet be adjusted, such that the receiver stage 100 (i.e., the receiver 102) is tuned to RF with a frequency offset $f_{offs}$ relative to the downlink signal carrying the P-SS. Accordingly, the P-SS embedded in the downlink signal r(n) is received in an initial step 302 by the receiver 102 and will be processed by the correlator 112 in the format $$s_{offs}(n,m,f_{offs}) = s(n,m) \cdot e^{j2\pi n f_{offs}/f_s},$$

where $f_s$ is the sampling rate of the downlink signal that has been low-pass filtered and sub-sampled by the filter 110. When correlating this signal with s(n,m), a correlation peak will occur despite the frequency offset. This correlation peak is due to a property of the Zadoff-Chu sequence, namely that a frequency offset causes a time shift of the correlation peak but does not suppress its magnitude to zero.

Figure 4:
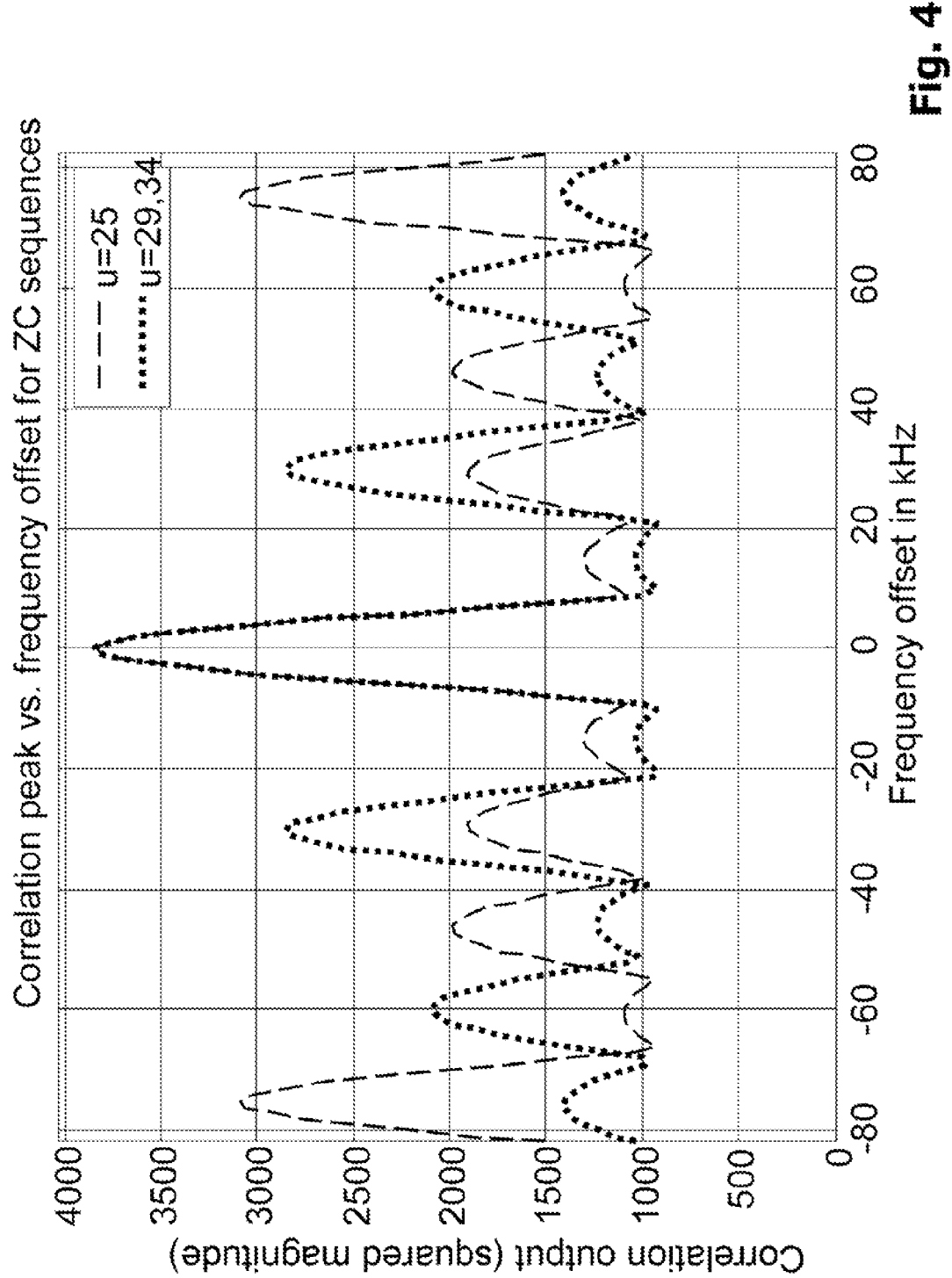
FIG. 4 is a diagram schematically illustrating a magnitude of the correlation output (correlation peak) dependent on the frequency offset between the received synchronization signal and a specific correlation signal.

The resulting time-frequency ambiguity does not allow a direct conclusion on the frequency offset from one correlation result. However, it has been observed that the magnitude of the correlation result varies with the frequency offset, as illustrated in FIG. 4. This observation can be exploited for determining the frequency offset as will now be discussed in more detail.

FIG. 4 illustrates a frequency offset dependency of a Zadoff-Chu sequence correlation result maximum ("correlation peak") for the three different Zadoff-Chu root sequences defined in section 6.11.1.1 of TS 36.211. As can be gathered from this diagram, the magnitude of the correlator output exhibits a plurality of individual peaks. The highest peak occurs for zero frequency offset, and the side peaks have a periodicity of 15 kHz.

Once the frequency location of the highest correlation peak (corresponding to zero frequency offset) is known, the frequency offset $f_{offs}$ between the un-adjusted reference frequency provided by the reference oscillator 118 and the frequency of the received downlink signal r(n) is known also. In such a case the reference oscillator 118 can be controlled to reduce this known frequency offset to the zero.

In order to determine the frequency location of the highest correlation peak, the received P-SS is correlated with correlation signals at different frequencies. To this end, three sets of correlation signals are provided. Each of the three sets includes multiple correlation signals that each comprise a specific one of the three Zadoff-Chu root sequences defined in section 6.11.1.1 of TS 36.211.

Figure 3:
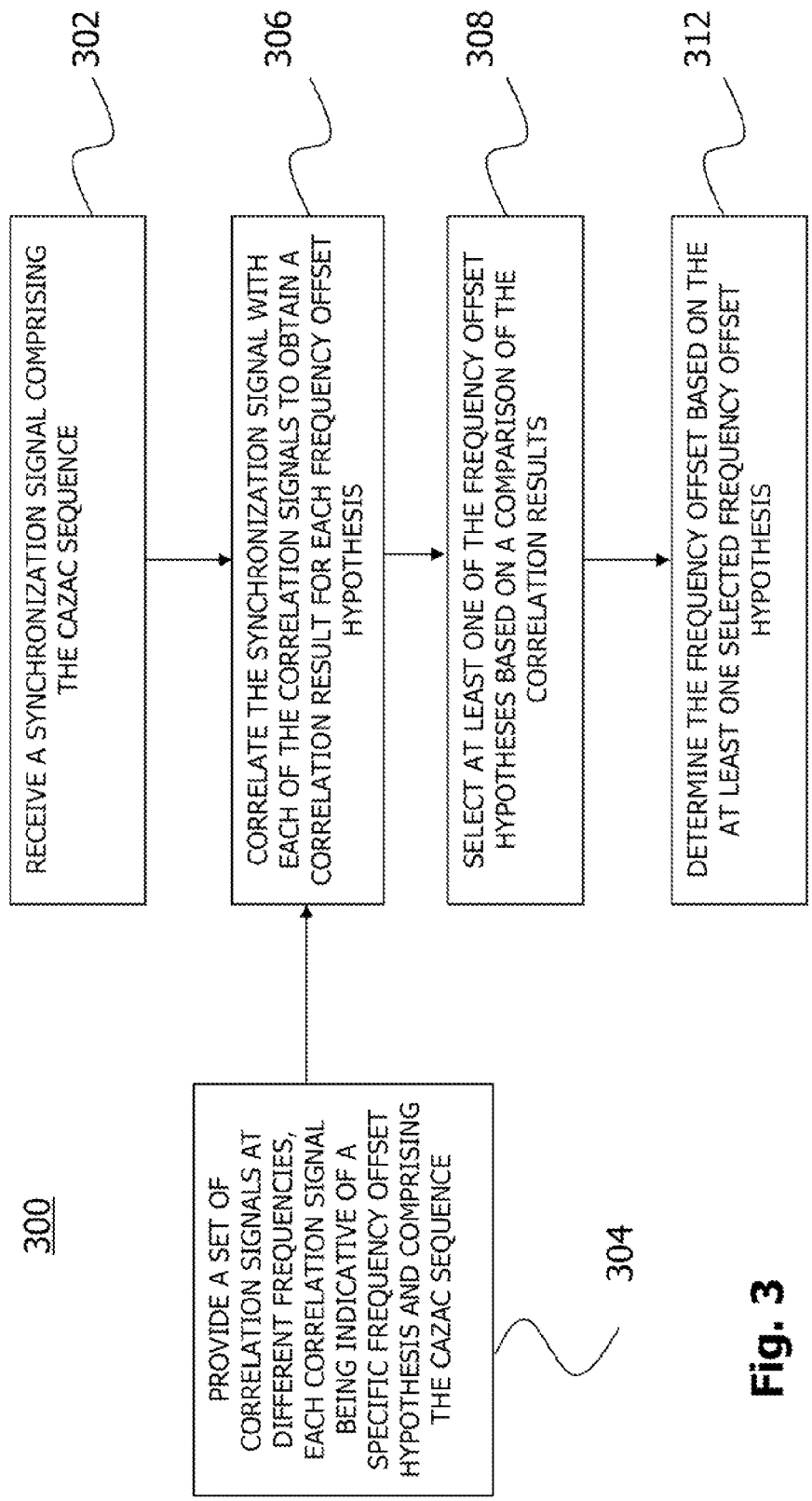
FIG. 3 shows a flow diagram according to a method embodiment.

The correlation signals of each signal set are provided at different frequencies as indicated by step 304 in FIG. 3. Thus, the multiple correlation signals of a specific signal set are indicative of different frequency offset hypotheses $f_h$, i.e.

$$s_{corr}(n,m,f_h) = s(n,m) \cdot e^{j2\pi n f_h/f_s}.$$

The correlator 112 is configured to correlate each individual one of the multiple correlation signals with the P-SS embedded in the received downlink signal (see step 306 in FIG. 3). For an efficient implementation of the correlator 112, the received downlink signal comprising the embedded P-SS may be filtered to extract the frequency range corresponding to the P-SS and sub-sampled to a suitable lower sampling rate $f_s$ by the optional filter 110.

Since the P-SS has a bandwidth of approximately 1 MHz, selecting the sampling rate $f_s=1.92$ MHz from the set of pre-defined LTE sampling rates is a practical choice. Consequently, with sub-sampling the number of samples to represent the OFDM symbol that includes the P-SS in the time domain becomes 128. The correlation as performed by the correlator 112 in step 306 may thus be described by $$c(n, m, f_h) = \sum_{l=0}^{127} r(n+l) s_{corr}^*(l, m, f_h), n = 0, \ldots, (N-1),$$

where N+127 is the length of the received signal vector r(n) used for the correlation.

After frequency offset compensation a residual frequency offset of less than 4 to 5 kHz is advantageous for a successful cell search. The step size (i.e., frequency spacing) $\Delta f_h$ between adjacent hypotheses will be chosen to be twice or less than the residual offset. For a given step size, the distance to the closest step can never be larger than half of the step size. Given a predefined maximum residual frequency offset, the step size should thus at most amount to twice the difference.

Moreover, it is important to take the periodicity in the diagram of FIG. 4 into account when selecting a suitable step size. Otherwise it can happen that if the best hypothesis, i.e. the hypothesis closest to the actual frequency offset, is displaced from the maximum of the highest correlation peak, a worse hypothesis may coincide with the maximum of a weaker side peak. This may lead to a wrong decision as shown in FIG. 5.

Figure 5:
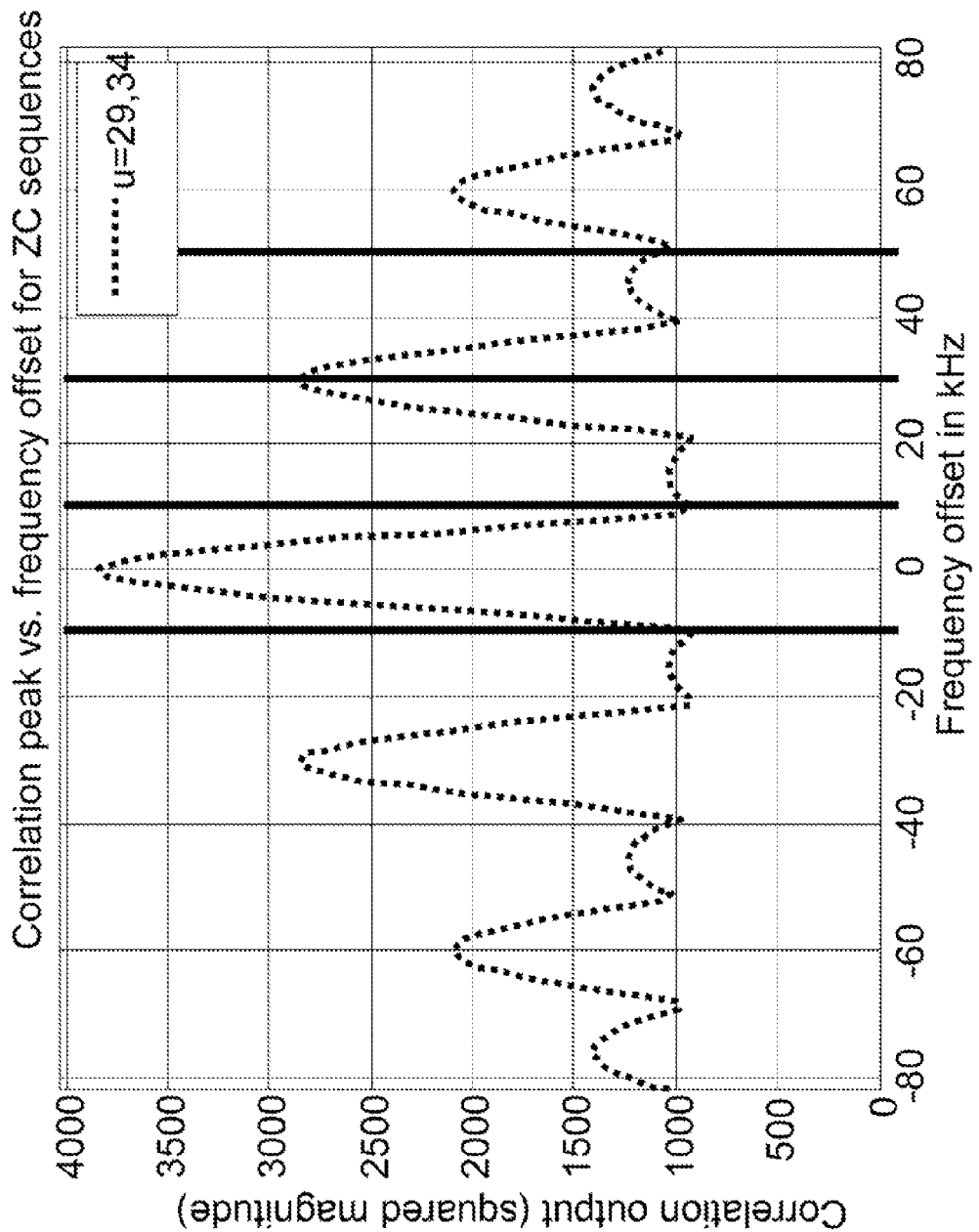
FIG. 5 shows the diagram of FIG. 5 with widely spaced frequency hypothesis.

FIG. 5 illustrates the frequency offset dependency of the maximum of the Zadoff-Chu sequence correlation result for two of the three Zadoff-Chu root sequences defined in section 6.11.1.1 of TS 36.211. As becomes apparent from the diagram of FIG. 5, the correlator output comprises a maximum at a frequency offset of 0 kHz as well as weaker side peaks that are spaced from the main peak at 15 kHz intervals. In the scenario of FIG. 5, an exemplary step size of $\Delta f_h=20$ kHz has been chosen. Due to the arbitrary placement of the resulting 20 kHz pattern in FIG. 5, the highest side peak at a frequency offset of 30 kHz will erroneously be identified as the best correlation peak. As a result, the residual frequency offset after frequency offset compensation will still amount to 30 kHz, which is unacceptably high.

Figure 6:
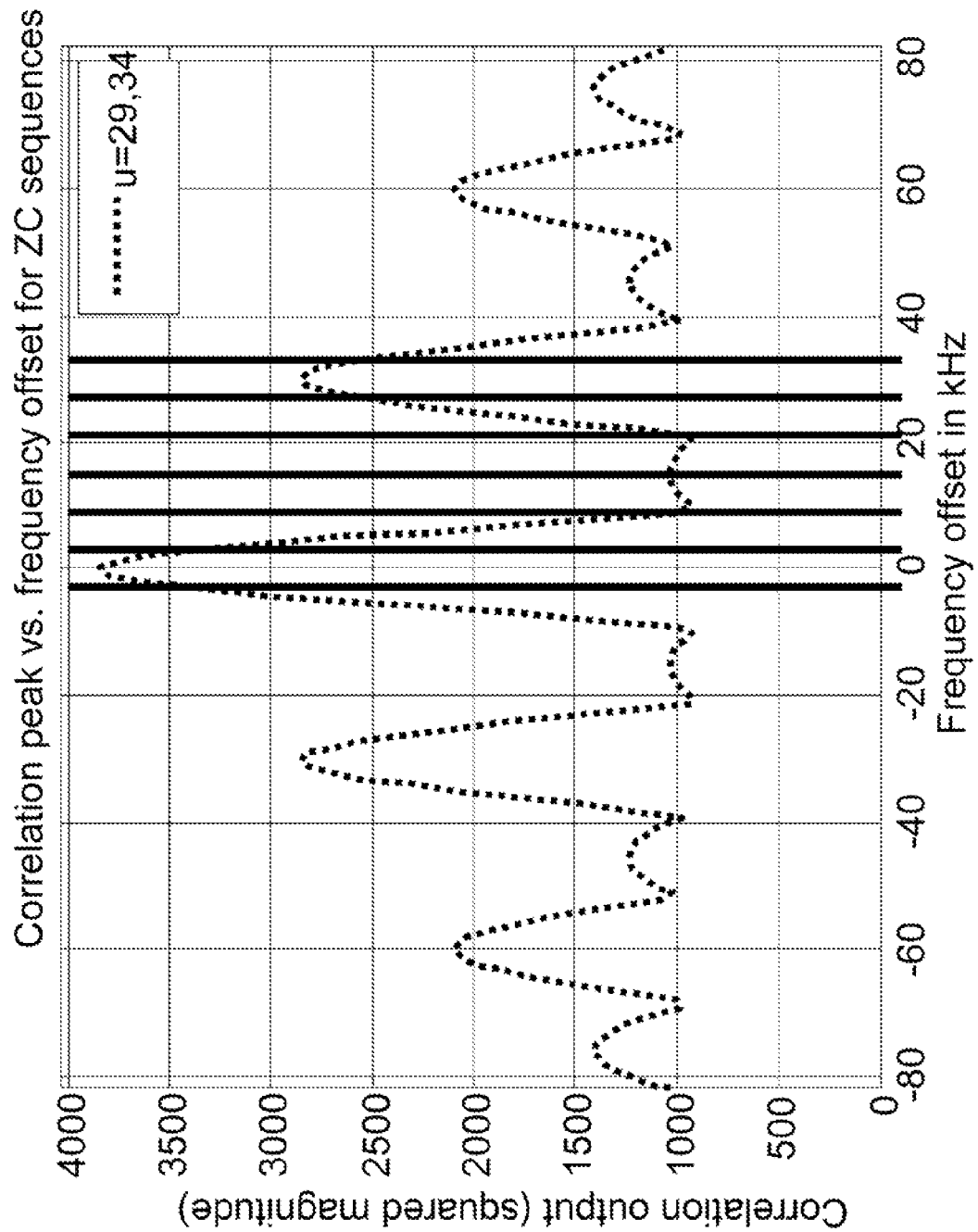
FIG. 6 shows the diagram of FIG. 5 with narrowly spaced frequency hypothesis.

With a step size of 7.5 MHz, the displacement of the primary and secondary hypotheses will be the same. The resulting 7.5 kHz pattern is illustrated in the diagram of FIG. 6. As can be derived from FIG. 6, a step size of 7.5 MHz (i.e., of half the LTE subcarrier spacing) preserves the relative magnitude between the highest correlation peak and the weaker side peaks.

To span a frequency offset range of ±40 kHz, the hypotheses may for example be chosen as $f_h=[-5.5:1:5.5] \cdot 7.5$ kHz = $[-41.25:7.5:+41.25]$ kHz. In this example, 3×12=36 hypotheses have to be tested in step 306, i.e. 12 frequency hypotheses for each of the three possible values of $u_m$.

In a next step 308, the best hypothesis has to be selected based on the correlation results. In the simplest case, the best hypothesis is chosen to correspond to the absolute maximum of the magnitude of all correlation functions $c(n,m,f_h)$ or $c_f(n,m,f_h)$, i.e.

$$f_h^{best}:\max(|c(n,m,f_h)|) \forall f_h, m,$$

where $f_{en}=f_h^{best}$ is the estimated frequency offset. The present and following description is based on $c(n,m,f_h)$. However, the same algorithm can be applied to $c_f(n,m,f_h)$ as well.

Based on the best hypothesis selected in step 308, the determination unit 122 determines in step 310 the actual frequency offset. The actual frequency offset may, for example, be determined by identifying the correlation signal associated with the best hypothesis in a first step and by looking-up (e.g., in pre-defined table) the frequency offset associated with this specific correlation signal.

After the frequency offset has thus been determined, a control signal for the reference oscillator 118 is generated. This control signal prompts the reference oscillator 118 to adjust the current reference frequency by an amount corresponding to the determined frequency offset.

In the above scenario, in which the absolute maximum of the magnitude of all correlation functions, or signals, is selected, the optional interpolator 120 shown in FIG. 2 can be omitted. In a refined operational mode of the frequency offset estimator 116, a number of hypotheses around the best one may be selected in step 308 and used for interpolation by the interpolator 120.

The interpolation starts with determining the parameters of the best hypothesis $$\{n^{best}, m^{best}, f_h^{best}\}:\max(|c(n,m,f_h)|) \forall n, m, f_h,$$

where $m^{best}$ and $f_h^{best}$ indicate the correlation function including the best correlation value and $n^{best}$ its time position. In a next step, the correlation values for the interpolation may be generally chosen as $$\max(|c(n^{best}, m^{best}, f_h^{best} - 2\Delta f_h)| - t, 0)$$

$$\max(|c(n^{best}, m^{best}, f_h^{best} - \Delta f_h)| - t, 0)$$

$$\max(|c(n^{best}, m^{best}, f_h^{best})| - t, 0)$$

$$\max(|c(n^{best}, m^{best}, f_h^{best} + \Delta f_h)| - t, 0)$$

$$\max(|c(n^{best}, m^{best}, f_h^{best} + 2\Delta f_h)| - t, 0)$$

where an additional threshold can be used to eliminate correlation values that are imitated by noise. Any kind of interpolation method known in the art may be used. In case of a polynomial interpolation, the corresponding number of correlation values from the above general set has to be selected. If, for example, a cubic interpolation is used, only three values $$c_1 = \max(|c(n^{best}, m^{best}, f_h^{best} - \Delta f_h)| - t, 0)$$

$$c_2 = \max(|c(n^{best}, m^{best}, f_h^{best})| - t, 0)$$

$$c_3 = \max(|c(n^{best}, m^{best}, f_h^{best} + \Delta f_h)| - t, 0)$$

are needed.

In the following, a simple heuristic algorithm based on linear interpolation between these three values is given as an example. First, the threshold is calculated as $$t = (|c(n^{best}, m^{best}, f_h^{best} - \Delta f_h)| + |c(n^{best}, m^{best}, f_h^{best})| + |c(n^{best}, m^{best}, f_h^{best} + \Delta f_h)|)/4,$$

and from the resulting values $c_1, c_2, c_3$, the frequency offset is estimated in step 310 by $$f_{co} = \frac{c_1 \cdot (f_h^{best} - \Delta f_h) + c_2 \cdot f_h^{best} + c_3 \cdot (f_h^{best} + \Delta f_h)}{c_1 + c_2 + c_3}.$$

Once the frequency offset has thus been estimated, a control signal for the reference oscillator 118 can be generated by the frequency offset estimator 116 as described above.

In addition to the basic signal processing operations described above, a front end of the frequency offset estimator 116 may be adapted to perform at least one of averaging and filtering operations. Such additional operations enhance the frequency offset determination procedure as will now be described in more detail.

To improve the correlation results, the frequency offset estimator 116 may apply averaging prior to the selection step 308. It has already been mentioned that the P-SS is transmitted every 5 ms. Consequently, the averaging can be done in blocks of 5 ms or a multiple thereof. To this end, the filtered and sub-sampled downlink signal may, for example, be cut into consecutive 5 ms blocks. Each 5 ms block is correlated with each of the hypotheses. The 5 ms blocks of the correlation functions are added up and averaged separately for each hypothesis. Averaging can also be done with non-consecutive 5 ms blocks as long as the blocks fit into a 5 ms raster (i.e., they should be separated in time by a multiple of 5 ms such that corresponding peaks occur at the same timing relative to the beginning of the 5 ms block).

As a further improvement, the frequency offset estimator 116 may filter the magnitude or squared magnitude of the correlation functions $c(n,m,f_h)$, i.e. $|c(n,m,f_h)|$ or $|c(n,m,f_h)|^2$, before the selection step 308. Filtering may be based, for example, on a sliding window using a simple FIR filter with all "ones" coefficients of length $l_f + 1$ $$c_f(n, m, f_h) = \sum_{l=0}^{t_f} |c(n+l, m, f_h)|^2, n = 0, \ldots, (N-1).$$

This filtering collects the energy of multiple paths in a hypothesis and thus suppresses noise contribution further by the inherent averaging.

As has become apparent from the above description of several embodiments, the testing of multiple frequency offset hypotheses in relation to the received synchronization signal is capable of resolving the time-frequency ambiguity of Zadoff-Chu and similar sequences. As a result, the initial frequency offset between an access network and a user terminal can efficiently be determined and compensated. Quality and robustness of the frequency offset determination can easily be adjusted by varying one or more of the parameters discussed above (e.g., the number of frequency hypotheses by changing the frequency spacing, or step size, between two correlation signals).

The optional application of interpolation techniques based on correlation results for discrete frequency hypothesis permits to overcome the comparatively rough "quantization" of the frequency offset estimates as defined by the frequency spacing between two correlation signals adjacent in the frequency spectrum. The optional implementation of (low-pass) filtering operations and/or sample rate decimating operations increases the detection performances and reduces the computational efforts for synchronization signal detection.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of determining a frequency offset between components of a communications network based on a Constant Amplitude Zero Auto-Correlation, or CAZAC, sequence, the method comprising:
    providing, by a provisioning unit in a receiver stage, a set of correlation signals at different frequencies, each correlation signal being indicative of a specific frequency offset hypothesis and comprising the CAZAC sequence;
    receiving, at a radio frequency receiver of the receiver stage, a synchronization signal comprising the CAZAC sequence;
    correlating the synchronization signal with each of the correlation signals to obtain a correlation result for each frequency offset hypothesis;
    selecting at least one of the frequency offset hypotheses based on a comparison of the correlation results; and
    determining the frequency offset based on the at least one selected frequency offset hypothesis, wherein
        the communications network supports Orthogonal Frequency Divisional Multiplexing, or OFDM, and
        a frequency spacing of the correlation signals is approximately half or less of the OFDM subcarrier spacing.

2. The method of claim 1, wherein the communications network is a Long Term Evolution, or LTE, network, and wherein the frequency spacing is approximately 7.5 kHz or less.

3. The method of claim 1, wherein two or more of the frequency offset hypotheses are selected, and wherein the frequency offset is determined based on an interpolation of the selected frequency offset hypotheses.

4. The method of claim 1, wherein a single frequency offset hypothesis is selected and the frequency offset is determined to correspond to the selected frequency offset hypothesis.

5. The method of claim 1, wherein the correlation result for each correlation is a magnitude of a correlation output, and wherein at least the frequency offset hypothesis corresponding to the largest magnitude is selected.

6. The method of claim 1, wherein a set of different CAZAC sequences possibly included in the synchronization signal is defined, and wherein for each possible CAZAC sequence a set of correlation signals is provided and correlated with the synchronization signal so as to determine the specific CAZAC sequence included in the synchronization signal.

7. The method of claim 1, further comprising filtering the received synchronization signal to extract a frequency range prior to the correlation step.

8. The method of claim 1, further comprising sub-sampling the received synchronization signal to reduce the computational complexity of the correlation step.

9. The method of claim 8, further comprising providing each correlation signal at a sampling rate of the sub-sampled synchronization signal.

10. The method of claim 1, further comprising averaging multiple correlation results obtained for each correlation signal prior to the selection step.

11. The method of claim 1, further comprising filtering the correlation results prior to the selection step.

12. The method of claim 1, wherein, in the correlating step, the CAZAC sequence has the property that a frequency offset between the synchronization signal and each of the correlation signals does not suppress a magnitude of the correlation result and/or causes a time shift of the correlation result.

13. The method of claim 1, wherein the CAZAC sequence is a Zadoff-Chu sequence.

14. A device for determining a frequency offset between components of a communications network based on a Constant Amplitude Zero Auto-Correlation, or CAZAC, sequence, the device comprising:
a provisioning unit adapted to provide a set of correlation signals at different frequencies, each correlation signal being indicative of a specific frequency offset hypothesis and comprising the CAZAC sequence;
a radio frequency receiver adapted to receive a synchronization signal comprising the CAZAC sequence;
a correlator adapted to correlate the synchronization signal with each of the correlation signals to obtain a correlation result for each frequency offset hypothesis;
a selector adapted to select at least one of the frequency offset hypotheses based on a comparison of the correlation results; and
a determination unit adapted to determine the frequency offset based on the at least one selected frequency offset hypothesis, wherein
the terminal is configured to support Orthogonal Frequency Division Multiplexing, or OFDM, and
a frequency spacing of the correlation signals is approximately half or less of the OFDM subcarrier spacing.

15. The device of claim 14, further comprising an interpolator adapted to interpolate a plurality of selected frequency offset hypotheses, wherein the determination unit is adapted to determine the frequency offset based on an interpolation result.

* * * * *